Patented May 25, 1937

2,081,498

UNITED STATES PATENT OFFICE 2,081,498

PROCESS FOR EXTRACTING MINERAL OILS WITH BASIC SELECTIVE SOLVENTS

David R. Merrill, Long Beach, Calif., assignor to Union Oil Company of California, Los Angeles, Calif., a corporation of California No Drawing. Application January 19, 1935, Serial No. 2,583

5 Claims. (Cl. 196—13)

This invention relates to a method for extracting oil with solvents; such oil may be vegetable oils or animal oils, and relates particularly to the petroleum oils such as kerosene, gasoline and lubricating oils. The process relates particularly to methods of solvent extraction of petroleum oils with selective solvents which are polar in nature and highly reactive chemically. Such solvents are, for example, sulfur dioxide, aniline, chloraniline, ammonia, phenol, chlorphenol and furfural.

Many of the petroleum stocks extracted contain organic acids such as naphthenic acids. Many of such stocks contain basic compounds such as quinoline, derivatives of quinoline, derivatives of the non-aromatic bases such as those discovered by Dr. J. R. Bailey and reported in the Journal of the American Chemical Society, volume 52, pages 1239–1250 (1930), volume 53, pages 3160–3164 (1931) and volume 55, pages 4145–4149 (1933). These organic acids and bases, because of their polar character, tend to concentrate in the extract rather than the raffinate phase in a solvent extraction operation.

Stocks which contain naphthenic acids are kerosene stocks, gasoline stocks and lubricating stocks. In extracting such stocks with basic solvents such as aniline, chloraniline and liquid ammonia, these acids react with the solvents to form salts, and at the high temperatures employed with some of these solvents, especially in removing the solvent from the oil by distillation, which may reach as high as 250° F. or more, these acids may react with these arylamines to form anilides. These reaction products are usually discharged with the extract causing a loss of solvent. In using acidic selective solvents such as chlorphenols and liquid sulfur dioxide, the organic bases present in the stock may react with these acidic materials to cause a loss of solvent into the extract in the form of salts or other reaction products.

This loss in both of these cases occurs even though relatively high temperatures and vacuum are employed upon the extract containing the solvent for recovery of solvent. In the extracts from the Edeleanu process in operating upon California kerosenes and gasolines, residual sulfur dioxide is found in the extract even after stripping under vacuum. Neutralization of these extracts with sodium hydroxide has been found essential to remove residual sulfur dioxide.

In using furfural in solvent extraction of lubricating oil at the high temperatures employed loss of furfural occurs. The presence of organic bases or acids in the oil tends to catalyze this polymerization.

I have discovered that all of these disadvantages may be avoided by either one of the following three procedures.

(1) The naphthenic acids present in the stock to be treated may be removed prior to solvent extraction by washing with caustic soda and the organic bases may be removed by neutralizing with dilute sulfuric acid. Other bases and acids may be employed. Such procedures are well known as methods for removing naphthenic acids and organic nitrogen bases. Material so treated is then extracted with any of the solvents above mentioned. The loss of the acidic and basic solvents as salts, or of the aryl amines as anilides or the loss of furfural due to polymerization will either be obviated or materially reduced. No loss of solvent will result from chemical combination since the deleterious material has been removed from the stock.

(2) The extract material produced by extraction with either of the above basic or acidic selective solvents may be treated in the case of the basic compounds with an inorganic base such as sodium hydroxide or carbonate, calcium or magnesium hydroxide or other alkali material to liberate the bound solvent from the naphthenic acids to form inorganic naphthenates and the free selective solvent. The alkali material is preferably added before substantial heating of the extract phase occurs. In the case of aniline and chloraniline substituted amides are formed from salts of these bases due to the high temperatures obtained during the stripping of the solvent from the extract. By adding alkali material at a point in the recovery system used for the recovery of selective solvent from the extract at which only salts are present and at a temperature below that at which amide formation occurs, the amide formation can be prevented.

(3) A third modification is to remove the solvent from the extract phase without particular regard to temperature other than that required in solvent recovery, and then to contact the recovered extract oil containing amides with sodium hydroxide or any of the above mentioned alkaline materials to hydrolyze the amide, and recover the selective solvent. This is conveniently done by introducing into the base of the extract evaporator an amount of caustic soda or other alkaline material sufficient to hydrolyze the contained amides and react with the salts to liberate the selective solvent.

In applying this invention to the selective solvent process employing acidic materials such as phenol, chlorphenol, sulfur dioxide, instead of using the basic materials above mentioned, dilute acid such as acetic acid or oxalic acid or other organic acid forming an oil soluble salt of the base having low volatility is employed. Instead of using organic acids, dilute inorganic acids, such as hydrochloric acid or sulfuric acid may be employed. The action is analogous to that previously referred to in the case of the basic selective solvents, the reaction being to form salts of the bases present in the oil and to release the selective solvent which had formed salts of these bases. These acids may be introduced into such portion of the apparatus as, for instance, into the base of the evaporator to cause a release of the bound selective solvent in the extract.

The above matter is not to be taken as limiting my invention but merely as illustrating the best method of carrying it out, and many variations of said invention will suggest themselves to those skilled in the art.

I claim:

1. In a process of separating mineral oil into fractions relatively more paraffinic in character and relatively less paraffinic in character than the original oil with a selective solvent which is basic in character and reactive with acid constituents present in the oil, the step of neutralizing said acid constituents with an alkali prior to extraction of said oil with said basic selective solvent.

2. A process for the separation of mineral oil containing acidic constituents into fractions, which comprises treating said oil with an alkali to remove said acidic constituents and then extracting said alkali treated oil into a plurality of fractions with a selective solvent adapted to separate said oil into fractions relatively more paraffinic in character and less paraffinic in character than the original oil, said selective solvent being further characterized by being chemically reactive with the said acidic constituents removed from said mineral oil by treatment with alkali.

3. A process for the solvent fractionation of mineral oil containing acidic constituents of the character of naphthenic acids which comprises treating said oil with an alkali to remove said acid constituents and then extracting said alkali treated oil with a selective solvent of the basic type such as aniline into fractions relatively more paraffinic in character and relatively less paraffinic in character than the original oil.

4. A process for the separation of mineral oil containing acidic constituents into fractions with a basic selective solvent adapted to dissolve the non-paraffinic fractions of the oil and further characterized by being reactive with the acidic constituents of the oil which comprises treating said oil with an alkali to convert said acidic constituents into salts which are not reactive with said selective solvent and then extracting said alkali treated oil with a selective solvent.

5. A process according to claim 4 in which the reaction products produced by treating the oil with said alkali are removed prior to extraction of the oil with the selective solvent.

DAVID R. MERRILL.